(12) United States Patent
Dossche et al.

(10) Patent No.: US 9,234,357 B2
(45) Date of Patent: *Jan. 12, 2016

(54) ENGINEERED WATERPROOF PLASTIC COMPOSITE FLOORING AND WALL COVERING PLANKS

(71) Applicant: US Floors, Inc., Dalton, GA (US)

(72) Inventors: Piet V. Dossche, Rocky Face, GA (US); Philippe Erramuzpe, Augusta, GA (US)

(73) Assignee: US Floors, Inc., Dalton, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/816,181

(22) Filed: Aug. 3, 2015

(65) Prior Publication Data

US 2015/0337543 A1   Nov. 26, 2015

Related U.S. Application Data

(63) Continuation of application No. 13/657,750, filed on Oct. 22, 2012, now Pat. No. 9,156,233.

(51) Int. Cl.
*B32B 21/04* (2006.01)
*E04F 15/02* (2006.01)
(Continued)

(52) U.S. Cl.
CPC .............. *E04F 15/02188* (2013.01); *B32B 3/06* (2013.01); *B32B 3/30* (2013.01); *B32B 5/18* (2013.01); *B32B 7/12* (2013.01); *B32B 9/002* (2013.01); *B32B 21/04* (2013.01); *B32B 21/14* (2013.01); *B32B 25/04* (2013.01); *B32B 27/06* (2013.01); *B32B 27/20* (2013.01); *B32B 27/304* (2013.01); *B32B 27/32* (2013.01); *E04F 15/02038* (2013.01); *E04F 15/042* (2013.01); *B32B 21/08* (2013.01); *B32B 21/12* (2013.01); *B32B 23/04* (2013.01); *B32B 23/08* (2013.01);
(Continued)

(58) Field of Classification Search
CPC .......... E04C 2/38; E04C 2/243; E04C 2/246; B32B 21/14; B32B 23/04; B32B 21/12; B32B 21/08; B32B 23/08
USPC .......... 52/309.8, 309.14, 309.15, 177, 589.1, 52/591.1, 588.1, 403.1, 592.1; 428/502, 428/503, 528, 530, 215, 537.1, 537.5, 54, 428/301.4, 511, 512, 455, 319.3, 535, 536
See application file for complete search history.

(56) References Cited

U.S. PATENT DOCUMENTS 2,758,044 A * 8/1956 Terry ...................... B32B 27/00
                                                                    428/535
3,908,725 A   9/1975 Koch
(Continued)

FOREIGN PATENT DOCUMENTS

CN   1482166   3/2004
CN   2765969   3/2006
(Continued)

OTHER PUBLICATIONS

AQUA-STEP; Promotional Website, Internet, Allegedly Nov. 24, 2009.
(Continued)

*Primary Examiner* — Chi Q Nguyen
(74) *Attorney, Agent, or Firm* — Miller & Martin PLLC

(57) ABSTRACT

Waterproof engineered floor and wall planks have a veneer layer, an extruded plastic composite core, a click-lock edge fastening system, and, alternatively, an underlayer.

47 Claims, 4 Drawing Sheets

(51) Int. Cl.

| | | |
|---|---|---|
| *E04F 15/04* | (2006.01) | |
| *B32B 3/06* | (2006.01) | |
| *B32B 3/30* | (2006.01) | |
| *B32B 5/18* | (2006.01) | |
| *B32B 7/12* | (2006.01) | |
| *B32B 9/00* | (2006.01) | |
| *B32B 27/20* | (2006.01) | |
| *B32B 21/14* | (2006.01) | |
| *B32B 25/04* | (2006.01) | |
| *B32B 27/06* | (2006.01) | |
| *B32B 27/30* | (2006.01) | |
| *B32B 27/32* | (2006.01) | |
| *B32B 21/08* | (2006.01) | |
| *E04C 2/24* | (2006.01) | |
| *B32B 21/12* | (2006.01) | |
| *B32B 23/04* | (2006.01) | |
| *B32B 23/08* | (2006.01) | |
| *E04C 2/38* | (2006.01) | |

(52) U.S. Cl.
CPC ......... *B32B 2307/73* (2013.01); *B32B 2419/04* (2013.01); *E04C 2/246* (2013.01); *E04C 2/38* (2013.01); *E04F 2201/0146* (2013.01); *E04F 2201/023* (2013.01); *E04F 2290/00* (2013.01)

(56) References Cited

U.S. PATENT DOCUMENTS

| | | | |
|---|---|---|---|
| 4,724,187 A | 2/1988 | Ungar | |
| 6,348,268 B1 * | 2/2002 | Donnelly | B32B 7/12 428/425.1 |
| 6,617,009 B1 | 9/2003 | Chen | |
| 6,986,934 B2 | 1/2006 | Chen | |
| 7,155,871 B1 | 1/2007 | Stone | |
| 7,168,221 B2 * | 1/2007 | Hunter, Jr. | E04D 3/38 156/71 |
| 7,169,460 B1 | 1/2007 | Chen | |
| 7,211,310 B2 | 5/2007 | Chen | |
| 7,261,947 B2 | 8/2007 | Reichwein | |
| 7,419,717 B2 | 9/2008 | Chen | |
| 7,544,423 B2 | 6/2009 | Horton | |
| 7,763,345 B2 | 7/2010 | Chen | |
| 7,770,350 B2 | 8/2010 | Moriau | |
| 7,866,115 B2 | 1/2011 | Pervan | |
| 7,877,956 B2 | 2/2011 | Martensson | |
| 8,021,741 B2 | 9/2011 | Chen | |
| 8,099,919 B2 | 1/2012 | Garcia | |
| 8,171,691 B1 | 5/2012 | Stone | |
| 8,234,829 B2 | 8/2012 | Thiers | |
| 8,431,054 B2 | 4/2013 | Pervan | |
| 8,834,992 B2 | 9/2014 | Chen | |
| 8,875,465 B2 | 11/2014 | Martensson | |
| 2002/0025446 A1 | 2/2002 | Chen | |
| 2002/0046527 A1 | 4/2002 | Nelson | |
| 2003/0024199 A1 | 2/2003 | Pervan | |
| 2004/0016196 A1 | 1/2004 | Pervan | |
| 2004/0200154 A1 | 10/2004 | Hunter | |
| 2004/0248489 A1 | 12/2004 | Hutchison | |
| 2004/0255538 A1 | 12/2004 | Ruhdorfer | |
| 2005/0003160 A1 | 1/2005 | Chen | |
| 2005/0136234 A1 | 6/2005 | Hak | |
| 2007/0130872 A1 | 6/2007 | Goodwin | |
| 2008/0261019 A1 | 10/2008 | Shen et al. | |
| 2009/0000232 A1 * | 1/2009 | Thiers | B44C 1/26 52/588.1 |
| 2009/0260313 A1 * | 10/2009 | Segaert | E04F 15/02 52/592.1 |
| 2011/0167744 A1 | 7/2011 | Whispell | |
| 2011/0247285 A1 | 10/2011 | Wybo | |
| 2011/0300392 A1 | 12/2011 | Vermeulen | |
| 2012/0276348 A1 * | 11/2012 | Clausi | E04F 13/002 428/196 |
| 2013/0104478 A1 * | 5/2013 | Meersseman | E04F 15/02 52/309.1 |
| 2013/0171377 A1 | 7/2013 | Aravamudan | |
| 2013/0192158 A1 * | 8/2013 | Cappelle | B32B 7/02 52/588.1 |
| 2014/0087158 A1 * | 3/2014 | Ciuperca | B32B 7/02 428/215 |
| 2014/0290158 A1 | 10/2014 | Meersseman | |
| 2014/0356594 A1 | 12/2014 | Chen | |
| 2015/0159379 A1 | 6/2015 | Meersseman | |
| 2015/0167320 A1 | 6/2015 | Meersseman | |
| 2015/0225964 A1 * | 8/2015 | Chen | B29C 47/0019 52/177 |

FOREIGN PATENT DOCUMENTS

| | | |
|---|---|---|
| CN | 1911997 | 2/2007 |
| CN | 200720034739.X | 1/2008 |
| CN | ZL 200620075187.2 | 2/2008 |
| CN | 100462398 | 2/2009 |
| CN | 101367977 | 2/2009 |
| CN | 201339298 | 11/2009 |
| CN | 101614068 | 12/2009 |
| CN | 101767362 | 7/2010 |
| CN | 101487336 | 10/2010 |
| CN | 202023326 U | 12/2010 |
| CN | 101955614 | 1/2011 |
| CN | 101613503 | 5/2011 |
| CN | 101698749 | 10/2011 |
| CN | 201120467334 | 7/2012 |
| CN | 201120467683 | 7/2012 |
| EP | 2202056 | 6/2010 |
| GB | 518239 | 2/1940 |
| WO | 2010081860 | 7/2010 |
| WO | 2012/061300 | 5/2012 |

OTHER PUBLICATIONS

Declaration of Piet V. Dossche, dated May 31, 2013.
Declaration of James C. Gould, dated Apr. 18, 2013.
Declaration of Kemp Harr, dated May 30, 2013.
Declaration of Co-Inventor Philippe Erramuzpe, dated Nov. 17, 2013.

* cited by examiner

ENGINEERED WATERPROOF PLASTIC COMPOSITE FLOORING AND WALL COVERING PLANKS

CLAIM OF PRIORITY

The present application is a continuation of and also claims priority to U.S. patent application Ser. No. 13/657,750, filed Oct. 22, 2012.

FIELD OF THE INVENTION

This invention relates to flooring, and particularly a new and improved waterproof flooring utilizing bamboo and plastic.

BACKGROUND OF THE INVENTION

In the flooring industry, there is a significant need for waterproof flooring that presents the appearance of a wooden floor. In particular, this flooring needs to be not only resistant to moisture, but also economical, easy to install, easy to maintain, and comfortable to walk on.

In the flooring industry, laminate flooring using fiberboard or particle board as the core layer has gained a tremendous market share. Such laminate flooring is manufactured with numerous desirable properties such as reasonable cost, stain resistance, wear resistance, easy maintenance, and fire resistance. In addition, laminate flooring is able to carry many types of printed designs, including wood grain designs.

Natural wood floors, particularly of oak and other hardwoods have been employed as flooring materials for centuries. While not as economical as laminate flooring, the appearance and comfort of wooden flooring is highly desirable. One of the most significant drawbacks to both laminate and wooden flooring is their performance when subjected to sustained exposure to moisture. In the case of wooden floors, moisture will cause swelling and warping of the flooring leading to an uneven surface and even gaps between the planks. In the case of laminate flooring, sustained exposure to moisture will frequently destabilize the integrity of the fiberboard or particle board material causing permanent and irreparable damage to the laminate boards. This leads many flooring installers to avoid the use of laminate flooring in areas that are subject to repeated or sustained moisture such as in the kitchen, bathroom, laundry room and basement areas of a house or in the commercial settings of restaurants and some retail stores.

As a result of the shortcomings of wood and laminate flooring, the choices for flooring in wet areas have traditionally been limited to ceramic tile, stone, and rubber or vinyl flooring. With ceramic tile and stone, the visual choices are limited, the cost of materials and installation is relatively high, and the resulting floors are cold in the absence of subsurface radiant heating and hard to stand on for extended periods of time. Rubber and vinyl floors can be relatively inexpensive, however, because these flooring materials are not rigid, imperfections from the subfloor transfers through the rubber or vinyl and appears on the floor surface which can be aesthetically jarring. In addition, the strength of adhesives used with rubber and vinyl floors can be compromised by moisture that can result in curling damage since the floors lack rigidity.

To address these issues, laminate flooring has been manufactured with improved moisture resistance through the selection of melamine, isocyanate or phenolic binders and through application of waterproofing materials and silicone caulking to seal voids. These steps remain inadequate however, both due to added time of installation and cost of manufacture, and because these waterproofing attempts are not 100% effective. One attempt to produce a suitable laminate plank is described in U.S. Pat. No. 7,763,345, and its related applications, where a thermoplastic material core is created and a print layer and a protective overlay are applied to the top side. The thermoplastic material core is typically a rigid polyvinylchloride compound and the core is extruded with cavities to provide cushioning. Extruded planks have a tendency to cup, however, and even with cavities, the PVC thermoplastic core is not inexpensive.

In modern construction it is also desirable to utilize green or recycled materials to minimize the environmental cost of construction. As a result, it is desirable to maximize the use of recycled or waste materials whenever possible. Therefore, a need exists for improved waterproof engineered flooring and wall covering material.

SUMMARY OF THE INVENTION

A feature of the present invention is to provide a rigid waterproof flooring or wall covering plank that includes the possibility of a wide variety of visual surface appearances, a rigid and relatively environmentally friendly core, and an optional cushioned backing. The engineered planks according to the invention may advantageously utilize a locking system so that the flooring can be snapped together as a floating floor, employing the floating floor installation method where no adhesive is required to bond the flooring planks to the subfloor. In addition, a portion of the engineered waterproof plank materials can comprise bamboo dust, wood dust or cork dust that is substantially a byproduct of other flooring manufacturing processes.

By combining the bamboo, wood or cork dust, or combination thereof, with high density polyethylene (HDPE), or polyvinylchloride (virgin, recycled, or a mixture thereof), a rigid and inert core is provided that does not absorb moisture and does not expand or contract, thereby eliminating the formation of peaks and gaps.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PRESENT INVENTION

Figure 1:
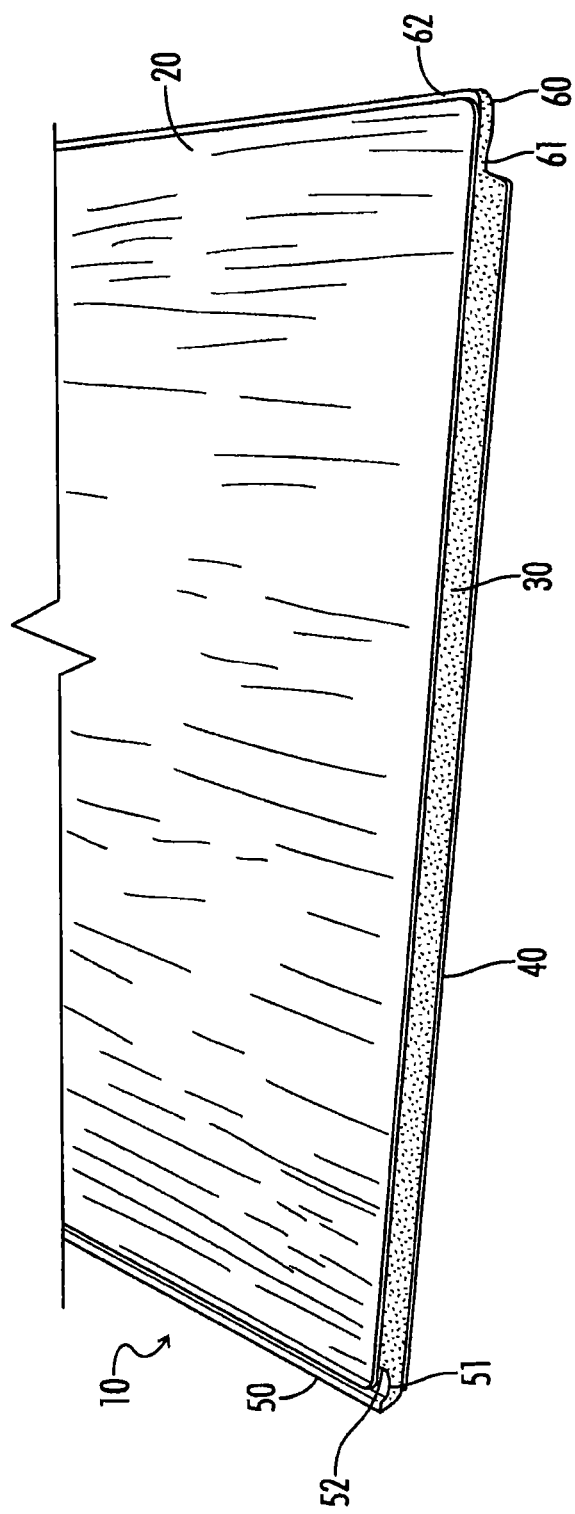
FIG. 1 is a perspective view of an exemplary engineered waterproof flooring plank according to the invention.

In general, the present invention relates to a waterproof engineered flooring plank or wall panel. The end view of the exemplary flooring plank 10 shown in FIG. 1 shows the three principal structural components of the plank. Specifically, the top surface is a veneer layer, such as wear layer 20, that is waterproof and is selected from a number of possible materials including: tile or stone veneers; rubber; decorative plastic; decorative vinyl; linoleum; and any material (such as cork, bamboo or wood veneer) encapsulated in vinyl or resin to render the layer waterproof and wear resistant. A decorative vinyl wear layer is particularly cost and performance effective. This surface is not only resistant to moisture, but can also be provided with a static coefficient of friction (CoF) of about 0.68 according to ASTM C 1028-96, and a CoF of at least about 0.60 is desirable for most applications.

The middle section or core 30 of the engineered plank 10 is a composite material formed from raw or unprocessed bamboo dust, wood dust, cork dust or a mixture thereof and high density polyethylene (HDPE) or alternatively, virgin or recycled PVC or a combination of such PVCs, and up to about 10% chemical additives such as anti-UV agents, anti-oxidation agents, stabilizers, colorants, anti-fungus agents, coupling agents, reinforcing agents, and lubricants. Calcium carbonate may also be added as a filler. After blending and melting the dust and HDPE or PVC, and additives and filler, the composite material is extruded to desired dimension. This type of HDPE and dust composite has previously been manufactured primarily for use as outdoor decks, railings and fences, but heretofore has not been used in a fashion that was sufficiently visually appealing or commercially viable for residential or commercial flooring. Instead, these wood-plastic or bamboo-plastic composites have been impregnated with colors according to a limited color pallet suitable and only promoted for exterior use. When used in the present invention, some additives, such as anti-UV agents, anti-fungals, and insecticides, are not needed. Also, heretofore, cork dust has not been a principal ingredient of the plastic composites. Whereas generally the addition of greater amounts of wood or bamboo dust provided greater rigidity to the resulting planks, cork dust retains some resilience even in the plastic mixture. The core 30 can be solid, or can be provided with channels or cavaties if desired, particularly in relatively thick embodiments.

The underlayment layer 40 is attached to the extruded dust and plastic core 30 and is also made of waterproof or water resistant material such as cork, rubber, foam or waterproof balancing paper.

The plank 10 also has a grooved end 50 with profile 51 and channel 52 that matches with protruding end 60 having profile 61 and protrusion 62. The particular profiles are made according to a preferred design to allow the panels to be quickly locked together, typically without the use of adhesive. However, if desired, an adhesive may be applied to the profiles therefore joining planks together to create a more permanent bonding of adjacent planks. The matching profiles may be of the click-lock variety depicted in FIGS. 3a-d or a more traditional tongue and groove construction that generally requires the use of an adhesive.

Figure 2:
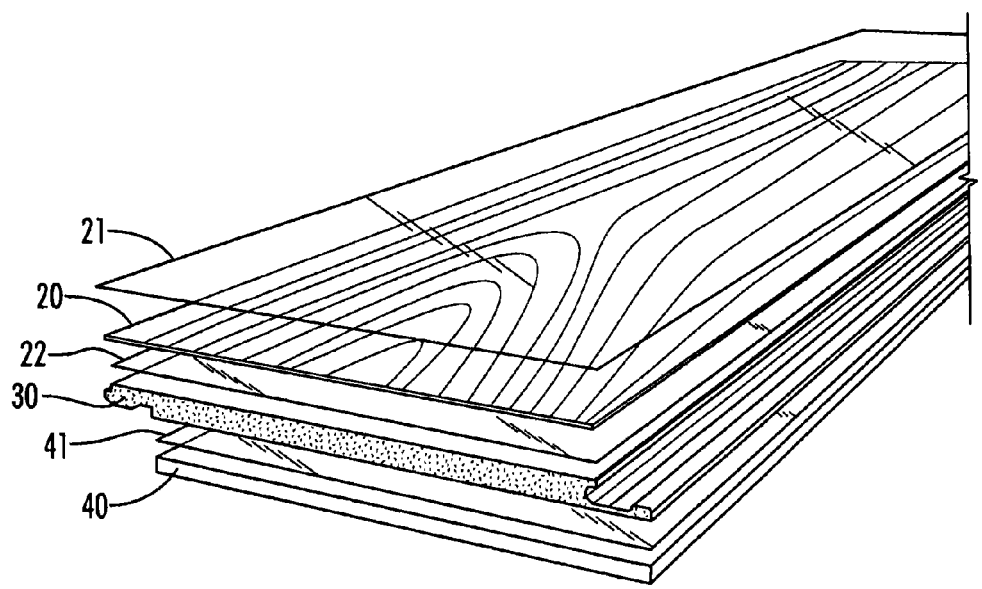
FIG. 2 is an exploded sectional view of an exemplary flooring plank according to the invention.

FIG. 2 is an exploded view of the various layers that may be included in a plank or wall panel of the invention. The top layer 21 is an optional protective overlay or cover layer that is most desirable when the wear layer 20 is not particularly durable. Preferred top layer characteristics include transparency, hardness and scratch resistance. Exemplary materials for a top layer 21 include melamine resin with aluminum oxide and polyurethane. Wear layer 20 is less likely to benefit from a top layer 21 when comprised of a durable material such as tile or stone, or when the wear layer 20 already includes a protective hardener such as is the case with resin or vinyl encapsulated bamboo, wood or cork.

A bonding layer 22 joins the wear layer 20 to the core 30 and is typically a water resistant adhesive. A preferred adhesive type is a hot melt adhesive that can be applied during the manufacture of the engineered flooring or wall covering, at temperatures over 200° F., and more commonly over 250° F., and is therefore not suitable for convenient use at a residence or commercial establishment when flooring is being installed. The hot melt adhesive should be water resistant or nearly impervious to significant and prolonged exposure to moisture.

Another bonding layer 41 joins the underlayment layer 40 to the core 30. As with the first bonding layer 22, this second bonding layer 41 is also preferably a hot melt adhesive that is nearly impervious to moisture. The underlayment layer 40 is selected from a variety of possible materials depending upon the price point and functionality of the flooring or wall covering planks.

Figure 3A:
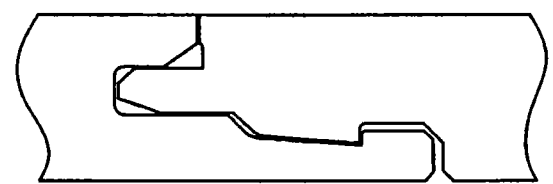
FIGS. 3*a*-*d* depict exemplary prior art click-lock edge configurations that may be advantageously used with various planks made according to the invention.
Figure 3B:
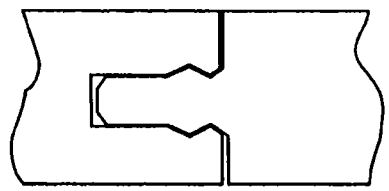
Figure 3C:
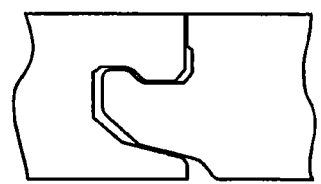
Figure 3D:
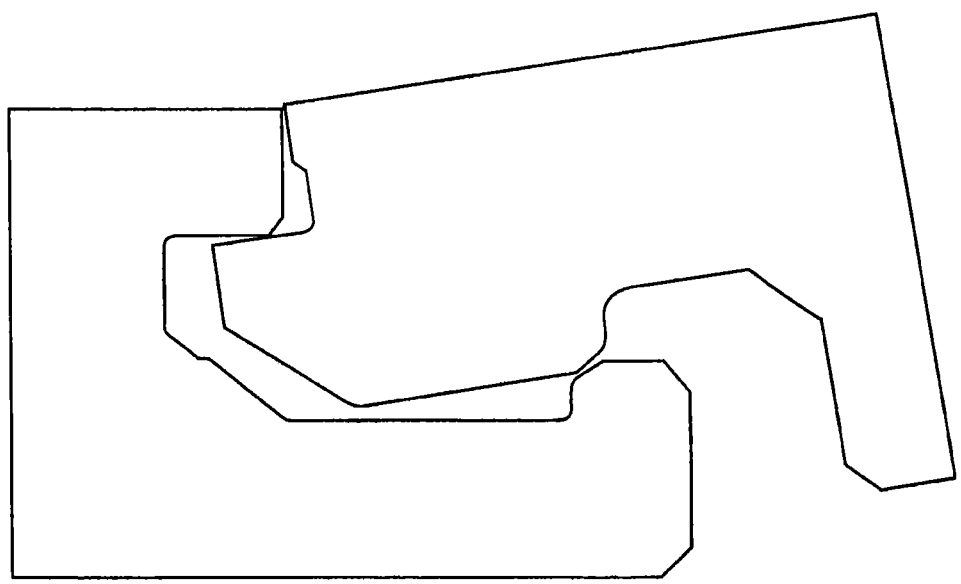

Planks according to the present invention are advantageously provided with click-lock edge systems, such as the protrusion 62 that co-operates with channel 52 and edge profiles 51, 61. Pervan, U.S. Pat. No. 6,023,907 and Morian, U.S. Pat. No. 6,006,486 disclose two of the leading edge fastening systems. FIGS. 3a-d show a variety of other click-lock edges. The system in FIG. 3a can be angled and snapped, FIG. 3b shows a snap joint, FIG. 3c can be angled and snapped but generally has less joining strength than the system of FIG. 3a. FIG. 3d also shows lock and fold panels with the first panel having a channel on the right edge being installed and the second panel being angled so that its protrusion enters the channel and the top edges of the two panels contact, and then rotating the second panel downward until the profiles are locked. When using click-lock edges, it is relatively straightforward to install floating flooring without adhesives. The particular edge system that is preferred for a particular plank may vary depending upon the dimensions and rigidity of the plank. It will also be understood that planks and panels according to the present invention can be installed using adhesives, and the adhesives can be applied to join the edges of the planks or to attach the planks to the subfloor or wall, or both.

The planks and panels according to the invention are generally rectangular having a thickness of up to about one inch (about 25.4 mm) and a width of between about 2 and 12 inches (about 50 mm to about 305 mm). In general, flooring planks will have a greater thickness than wall covering planks or panels. The use of recycled wood, cork or bamboo dust contributes to sustainability through the responsible management of resources, and provided bamboo, cork or sustainably harvested wood is used, results in an environmentally friendly building material.

The planks and panels manufactured according to the invention are nearly impervious to swelling and have great dimensional stability. These planks and panels exhibit variations due to moisture of less than 0.01%. The products can also be manufactured to tolerances of less than 0.25 mm of length, width and straightness, and many suitable wear layers provide colorfast and cleanable surfaces.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

We claim:

1. An engineered waterproof plank comprising:
   (a) a veneer layer adhered to a top surface of a rigid waterproof core, wherein the veneer layer is selected from the group consisting of wood veneer, cork veneer, bamboo veneer, tile veneer, stone veneer, rubber veneer, decorative plastic veneer, linoleum veneer and decorative vinyl veneer;

(b) a first waterproof adhesive layer bonding the veneer layer to the top surface of the waterproof core;
(c) the waterproof core comprising a plastic composite;
(d) the plank having a first edge with a groove extending laterally into the waterproof core and a second opposite edge with a lateral protrusion from the waterproof core, wherein the groove and protrusion have profiles shaped to form a click-lock edge fastening system.

2. The plank of claim 1 wherein the plastic composite comprises is an extruded plastic composite.

3. The plank of claim 1 wherein said plastic composite further comprises a plastic selected from the group consisting of high-density polyethylene and polyvinyl chlorides.

4. The plank of claim 1 wherein the plastic composite further comprises a plastic and a filler.

5. The plank of claim 4 wherein the filler comprises calcium carbonate.

6. The plank of claim 1 wherein the plastic composite further comprises a plastic and a dust, said dust selected from the group consisting of wood, bamboo, cork and a combination of two or more of wood, bamboo and cork.

7. The plank of claim 1 wherein the plastic composite further comprises a plastic and an additive, said additive selected from the group consisting of anti-UV agents, anti-oxidation agents, stabilizers, colorants, anti-fungus agents, coupling agents, reinforcing agents, and lubricants.

8. The plank of claim 1 further comprising a second waterproof adhesive layer bonding an underlayer to a bottom surface of the waterproof core, said underlayer selected from the group consisting of cork, rubber, foam and waterproof balance paper.

9. The plank of claim 1 further comprising a cover layer over the veneer layer.

10. The plank of claim 1 wherein the veneer layer is encapsulated in resin to render the veneer layer waterproof and wear resistant.

11. The plank of claim 1 wherein exposure to moisture results in swelling of plank dimensions by less than 0.01%.

12. The plank of claim 1 wherein the first waterproof adhesive layer further comprises a hot melt adhesive.

13. An engineered waterproof plank comprising:
(a) a veneer layer adhered to a top surface of a rigid waterproof core, wherein the veneer layer is selected from the group consisting of wood veneer, cork veneer, bamboo veneer, tile veneer, stone veneer, rubber veneer, decorative plastic veneer, linoleum veneer and decorative vinyl veneer;
(b) a first waterproof adhesive layer bonding the veneer layer to the top surface of the waterproof core;
(c) the waterproof core comprising a composite of a plastic and a material selected from the group consisting of a dust, a filler, an additive and a combination of two or more of such dust, such filler and such additive;
(d) the plank having a first edge with a groove extending laterally into the waterproof core and a second opposite edge with a lateral protrusion from the waterproof core, wherein the groove and protrusion have profiles shaped to form a click-lock edge fastening system.

14. The plank of claim 13 wherein the composite is an extruded composite.

15. The plank of claim 13 wherein said plastic is selected from the group consisting of high-density polyethylene and polyvinyl chlorides.

16. The plank of claim 13 wherein said filler further comprises calcium carbonate.

17. The plank of claim 13 wherein said dust further comprises a dust selected from the group consisting of wood dust, bamboo dust, cork dust and a combination of two or more of wood dust, bamboo dust and cork dust.

18. The plank of claim 13 wherein said additive further comprises one or more additives selected from the group consisting of anti-UV agents, anti-oxidation agents, stabilizers, colorants, anti-fungus agents, coupling agents, reinforcing agents, and lubricants.

19. The plank of claim 13 further comprising a second waterproof adhesive layer bonding an underlayer to a bottom surface of the waterproof core, said underlayer selected from the group consisting of cork, rubber, foam and waterproof balance paper.

20. The plank of claim 13 further comprising a cover layer over the veneer layer.

21. The plank of claim 13 wherein the veneer layer is encapsulated in resin to render the veneer layer waterproof and wear resistant.

22. The plank of claim 13 wherein exposure to moisture results in swelling of plank dimensions by less than 0.01%.

23. The plank of claim 13 wherein the first waterproof adhesive layer further comprises a hot melt adhesive.

24. An engineered waterproof plank comprising:
(a) a veneer layer adhered to a top surface of a rigid waterproof core, wherein the veneer layer is selected from the group consisting of wood veneer, cork veneer, bamboo veneer, tile veneer, stone veneer, rubber veneer, decorative plastic veneer, linoleum veneer and decorative vinyl veneer;
(b) a first waterproof adhesive layer bonding the veneer layer to the top surface of the waterproof core;
(c) a second waterproof adhesive layer bonding an underlayer to a bottom surface of the waterproof core, said underlayer selected from the group consisting of cork, rubber, foam and waterproof balance paper
(d) the waterproof core comprising a plastic composite;
(e) the plank having a first edge with a groove extending laterally into the waterproof core and a second opposite edge with a lateral protrusion from the waterproof core, wherein the groove and protrusion have profiles shaped to form a click-lock edge fastening system.

25. The plank of claim 24 wherein the plastic composite is an extruded plastic composite.

26. The plank of claim 24 wherein said plastic composite further comprises a plastic selected from the group consisting of high-density polyethylene and polyvinyl chlorides.

27. The plank of claim 24 wherein the plastic composite further comprises a plastic and a filler.

28. The plank of claim 27 wherein the filler comprises calcium carbonate.

29. The plank of claim 24 wherein the plastic composite further comprises a plastic and a dust, said dust selected from the group consisting of wood, bamboo, cork and a combination of two or more of wood, bamboo and cork.

30. The plank of claim 24 wherein the plastic composite further comprises a plastic and an additive, said additive selected from the group consisting of anti-UV agents, anti-oxidation agents, stabilizers, colorants, anti-fungus agents, coupling agents, reinforcing agents, and lubricants.

31. The plank of claim 24 further comprising a cover layer over the veneer layer.

32. The plank of claim 24 wherein the veneer layer is encapsulated in resin to render the veneer layer waterproof and wear resistant.

33. The plank of claim 24 wherein exposure to moisture results in swelling of plank dimensions by less than 0.01%.

34. The plank of claim 24 wherein the first waterproof adhesive layer further comprises a hot melt adhesive.

35. An engineered waterproof plank comprising: (a) a veneer layer, said veneer layer selected from the group consisting of decorative vinyl veneer and decorative plastic veneer; (b) said veneer layer joined by a waterproof bond to a top surface of a rigid waterproof core; (c) the waterproof core comprising a plastic composite; (d) the plank having a first edge with a groove extending laterally into the waterproof core and a second opposite edge with a lateral protrusion from the waterproof core, wherein the groove and protrusion have profiles shaped to form a click-lock edge fastening system.

36. The plank of claim 35 wherein the plastic composite is an extruded plastic composite.

37. The plank of claim 35 wherein said plastic composite further comprises a plastic selected from the group consisting of high-density polyethylene and polyvinyl chlorides.

38. The plank of claim 35 wherein the plastic composite further comprises a plastic and a filler.

39. The plank of claim 38 wherein the filler comprises calcium carbonate.

40. The plank of claim 35 wherein the plastic composite further comprises a plastic and a dust, said dust selected from the group consisting of wood, bamboo, cork and a combination of two or more of wood, bamboo and cork.

41. The plank of claim 35 wherein the plastic composite further comprises a plastic and an additive, said additive selected from the group consisting of anti-UV agents, anti-oxidation agents, stabilizers, colorants, anti-fungus agents, coupling agents, reinforcing agents, and lubricants.

42. The plank of claim 35 further comprising a waterproof adhesive layer bonding an underlayer to a bottom surface of the waterproof core, said underlayer selected from the group consisting of cork, rubber, foam and waterproof balance paper.

43. The plank of claim 35 further comprising a cover layer over the veneer layer.

44. The plank of claim 35 wherein the veneer layer is encapsulated in resin to render the veneer layer waterproof and wear resistant.

45. The plank of claim 35 wherein exposure to moisture results in swelling of plank dimensions by less than 0.01%.

46. The plank of claim 35 wherein the waterproof bonding layer further comprises a waterproof adhesive between the decorative vinyl veneer layer and the rigid waterproof core.

47. The plank of claim 35 wherein the waterproof bonding layer further comprises a melted bond between the decorative vinyl veneer layer and the plastic composite of the rigid waterproof core.

* * * * *

UNITED STATES PATENT AND TRADEMARK OFFICE
CERTIFICATE OF CORRECTION

| | |
|---|---|
| PATENT NO. | : 9,234,357 B2 |
| APPLICATION NO. | : 14/816181 |
| DATED | : January 12, 2016 |
| INVENTOR(S) | : Piet V. Dossche and Phillipe Erramuzpe |

It is certified that error appears in the above-identified patent and that said Letters Patent is hereby corrected as shown below:

Claims

Claim 2 listed on the Patent Certificate, at Col. 5, Line 10, should be as follows: "The plank of claim 1 wherein the plastic composite comprises an extruded plastic composite."

Signed and Sealed this
Nineteenth Day of April, 2016

Michelle K. Lee
*Director of the United States Patent and Trademark Office*